No. 736,450. PATENTED AUG. 18, 1903.
J. K. SHARPE, Jr.
CLOVER BUNCHER.
APPLICATION FILED MAR. 17, 1902.
NO MODEL.
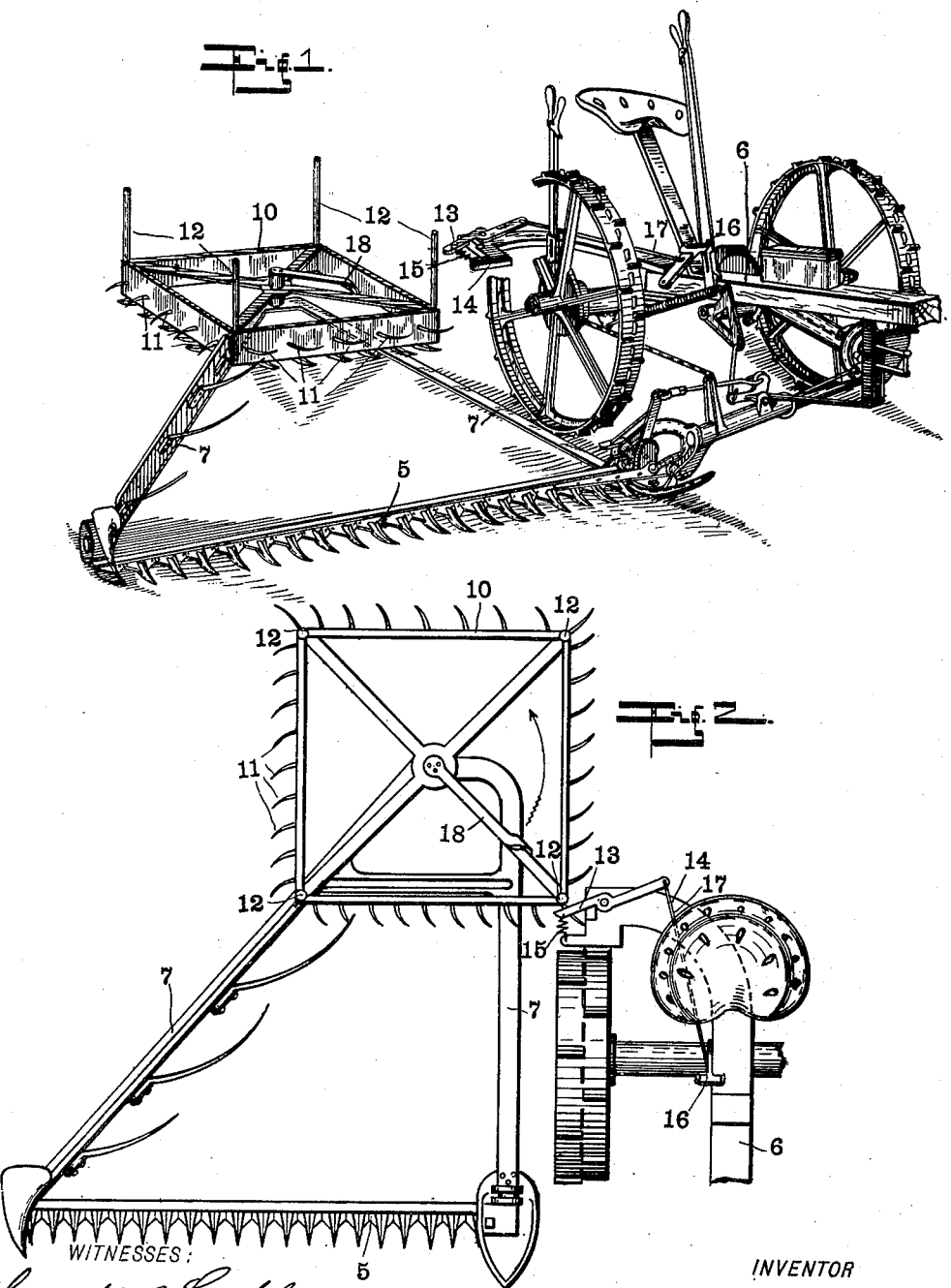
WITNESSES:
Frank A. Lahle
James Neller
INVENTOR
Joseph K. Sharpe Jr.
BY
Bradford Hood
ATTORNEYS No. 736,450. Patented August 18, 1903.

UNITED STATES PATENT OFFICE.

JOSEPH K. SHARPE, JR., OF INDIANAPOLIS, INDIANA.

CLOVER-BUNCHER.

SPECIFICATION forming part of Letters Patent No. 736,450, dated August 18, 1903.

Application filed March 17, 1902. Serial No. 98,552. (No model.)

*To all whom it may concern:*

Be it known that I, JOSEPH K. SHARPE, Jr., a citizen of the United States, residing at Indianapolis, in the county of Marion and State of Indiana, have invented certain new and useful Improvements in Clover-Bunchers, of which the following is a specification.

My invention relates to an improvement in that class of machines designed for attachment to or coöperation with mowing-machines for cutting and bunching low-seed crops, such as clover, alfalfa, &c. In machines of this class it has heretofore been customary to attach to the cutter-bar of an ordinary mowing-machine a slatted bottom which projects rearwardly from the cutter-bar and has mounted at its rear end a rake or other suitable holding means which normally operates to retain the cut crop upon the slatted bottom, but which is intermittently released, so as to allow the cut crop to escape in bunches from the slatted bottom, the removal of the bunch being accomplished by the friction thereof upon the ground. In machines of this type the cut crop has heretofore been deposited immediately behind the cutter, and in cutting the next swath the horses drawing the machine, together with the main body of the machine, must pass over the line of bunches of cut crop, thus knocking out considerable seed.

The object of my present invention is to provide a simple and efficient means for normally engaging the cut crop and for intermittently discharging the same in bunches, the bunches being removed transversely of the line of the travel of the cutter, so as to be deposited to the rear of the main body of the machine rather than to the rear of the cutter. An open passage next to the standing crop is thus cleared, which passage is free from the cut crop, forming an open roadway for the passage of the team and main body of the machine during the cutting of the next swath.

The accompanying drawings illustrate my invention.

Figure 1 is a perspective view of a usual form of mowing-machine to which my improved buncher has been attached. Fig. 2 is a plan thereof.

In the drawings, 5 indicates the usual cutter-bar of a mowing-machine 6. Secured to the cutter-bar 5 and extending rearwardly therefrom is a frame 7, and preferably somewhat nearer the machine 6 than the medial line of cutter 5 is a reel 10, which in the drawings is shown as four-sided. Each side of the reel is provided with horizontal teeth 11, which are curved slightly toward to the main body of the machine 6, and rising from each corner of the reel is a pin 12, which pin is adapted to be engaged by one arm of a lever 13, pivoted upon an extended arm 14, carried by machine 6. That end of lever 13 adjacent the path of travel of pins 12 is normally held out of the line of movement of said pins by means of a spring 15. Lever 13 may be swung so as to engage the adjacent pin 12 by means of a foot-lever 16, which is connected to the lever by means of a link 17.

The sides of reel 10 come successively into operative position, and the operating side lies parallel or substantially parallel with the cutter-bar 5 and at right angles to the line of movement of the machine. The cut crop after falling from the cutter-bar is engaged by the operating side of reel 10 and is carried along the ground thereby, the reel being held in normal position by means of a suitable detent 18. When a sufficient quantity of cut crop has been detained by the reel, the operator presses upon foot-lever 16, so as to cause lever 13 to engage the adjacent pin 12 and start reel 10 to revolve in the direction indicated by the arrow in Fig. 2, this movement being sufficient to release reel 10 from spring 18. During the continued advancement of the machine the cut bunch of crop will remain substantially stationary longitudinally, and its pressure against the then inclined operating-face of reel 10 will cause said reel to rotate upon its axis, so as to thus thrust the bunch transversely and deposit the same to the rear of the main body of the machine, this movement of the reel bringing a succeeding face thereof into operative position behind the cutter-bar.

It will be readily understood that the means for shifting the cut bunch transversely may assume many forms without departing from the spirit of my invention, and the movement of said means may be made automatic, if desired.

I claim as my invention—

1. As an article of manufacture, a buncher for mowing-machines consisting of a supporting means, a transversely-movable abutment carried by said supporting means, and means normally restraining movement of said abutment, all for the purpose set forth.

2. In a buncher the combination with a supporting means to be secured to a mowing-machine, of a rotatable reel mounted upon said supporting means to the rear of the cutter-bar to rotate in a plane substantially parallel with the plane of the cutter-bar, and means for temporarily preventing rotation of said reel, whereby upon the release of the said restraining means, the reel may rotate so as to shift the bunch of crop transversely of the line of movement of the machine.

3. In a buncher, the combination with supporting means to be secured to a mowing-machine, of a polygonal reel to engage the cut crop mounted thereon and rotatable in a plane substantially parallel with the plane of the cutter-bar, means for normally restraining rotation of said reel, and means for engaging said reel and giving the same an initial rotary movement whereby the bunch of crop will be shifted transversely of the line of movement of the machine and discharged therefrom.

4. The combination, with a mowing-machine, of a transversely-shiftable cut-crop-detaining abutment arranged to the rear of the cutter thereof so as to shove the detained crop along with the machine, and means for releasing said detaining-abutment, for the purpose set forth.

5. In a buncher, the combination with supporting means to be secured to a mowing-machine, of a polygonal reel to engage the cut crop mounted thereon and rotatable in a plane substantially parallel with the plane of the cutter-bar, means for normally restraining rotation of said reel, a lever to be mounted upon the mowing-machine, and means for causing said lever to engage the reel and rotate the same beyond its engagement by the detaining means, substantially as and for the purpose set forth.

In witness whereof I have hereunto set my hand and seal, at Indianapolis, Indiana, this 7th day of March, A. D. 1902.

JOSEPH K. SHARPE, JR. [L. S.]

Witnesses:
ARTHUR M. HOOD,
JAMES NELLER.